United States Patent
Sato

(10) Patent No.: US 8,817,403 B2
(45) Date of Patent: Aug. 26, 2014

(54) MAGNETIC DISK DRIVE AND METHOD FOR SERVO PREAMBLE LENGTH ADJUSTMENT APPLIED TO THE SAME

(75) Inventor: Takumi Sato, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/536,351

(22) Filed: Jun. 28, 2012

(65) Prior Publication Data
US 2013/0194692 A1     Aug. 1, 2013

(30) Foreign Application Priority Data
Jan. 31, 2012   (JP) .................................. 2012-018407

(51) Int. Cl.
*G11B 5/09*     (2006.01)

(52) U.S. Cl.
USPC ......................................... 360/49; 360/77.08

(58) Field of Classification Search
None
See application file for complete search history.

(56) References Cited

U.S. PATENT DOCUMENTS

2010/0142077 A1*   6/2010   Zaitsu et al. .................... 360/75

FOREIGN PATENT DOCUMENTS

| JP | 2006-114142 | 4/2006 |
|---|---|---|
| JP | 4232734 | 3/2009 |
| JP | 2011-008897 | 1/2011 |

* cited by examiner

*Primary Examiner* — Wayne Young
*Assistant Examiner* — Brian Butcher
(74) *Attorney, Agent, or Firm* — Patterson & Sheridan, LLP

(57) ABSTRACT

According to one embodiment, a magnetic disk drive includes a disk and a controller. The disk includes a plurality of zones each having a plurality of tracks. The disk is formatted such that a plurality of servo frames are discretely recorded in each of the plurality of tracks. The plurality of servo frames include servo preamble data of a second length which corresponds to the zone having the track and which is less than or equal to a first length serving as a reference. The controller allows a head to read the servo frames from the disk via a read amplifier.

10 Claims, 4 Drawing Sheets

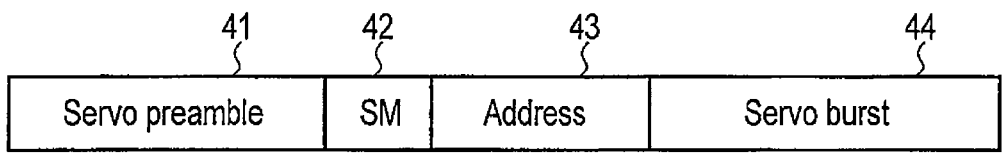
F I G. 4
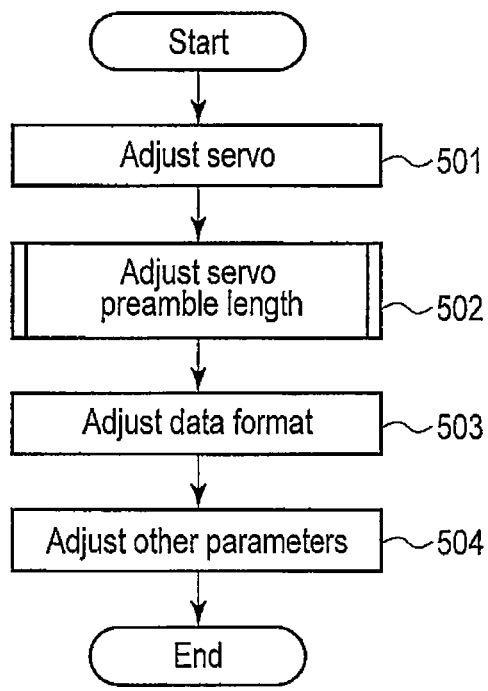
F I G. 5

US 8,817,403 B2

MAGNETIC DISK DRIVE AND METHOD FOR SERVO PREAMBLE LENGTH ADJUSTMENT APPLIED TO THE SAME

CROSS-REFERENCE TO RELATED APPLICATIONS

This application is based upon and claims the benefit of priority from prior Japanese Patent Application No. 2012-018407, filed Jan. 31, 2012, the entire contents of which are incorporated herein by reference.

FIELD

Embodiments described herein relate generally to a magnetic disk drive and a method for servo preamble length adjustment applied to the magnetic disk drive.

BACKGROUND

In a magnetic disk drive, a head (magnetic head) needs to be positioned at a target position on a disk (magnetic disk). Servo data is used for the head positioning. The servo data is, for example, discretely recorded at predetermined intervals in tracks (servo tracks) concentrically arranged on the disk. Areas in which the servo data is recorded are referred to as servo areas or servo frames. The servo data may also be referred to as servo frames.

The area between adjacent servo areas (servo frames) in a circumferential direction of the disk is used as a data area (data frame). The length of the data frame depends on the length of the servo frame. Thus, the possibility of reducing the servo frame length enables an increase in data frame length, that is, in the linear recording density of the disk. Hence, as an approach to increasing the linear recording density, various techniques have been proposed which optimize the servo frame length by varying a recording frequency for servo data, for example, with each head and with each zone.

In general, the servo data (servo frame) includes servo preamble data. The servo preamble data is used for generation of a servo clock signal using a phase-locked loop (PLL) and for phase acquisition (acquisition of the phase of a servo clock frequency). The servo clock signal is used to read the servo data.

The length of the servo preamble data (that is, servo preamble length) is set to a value with an appropriate margin so as to allow the phase of the servo clock frequency (the frequency of the servo clock signal) to be reliably acquired.

BRIEF DESCRIPTION OF THE DRAWINGS

FIG. 4 is a diagram showing an exemplary format of a servo frame applied in the embodiment;

FIG. 5 is a flowchart showing an exemplary procedure for an adjustment process including servo preamble length adjustment applied in the embodiment.

DETAILED DESCRIPTION

In general, according to one embodiment, a magnetic disk drive comprises a disk and a controller. The disk comprises a plurality of zones each having a plurality of tracks. The disk is formatted such that a plurality of servo frames are discretely recorded in each of the plurality of tracks. The plurality of servo frames comprise servo preamble data of a second length which corresponds to the zone having the track and which is less than or equal to a first length serving as a reference. The controller is configured to allow a head to read the servo frames from the disk via a read amplifier.

Figure 1:
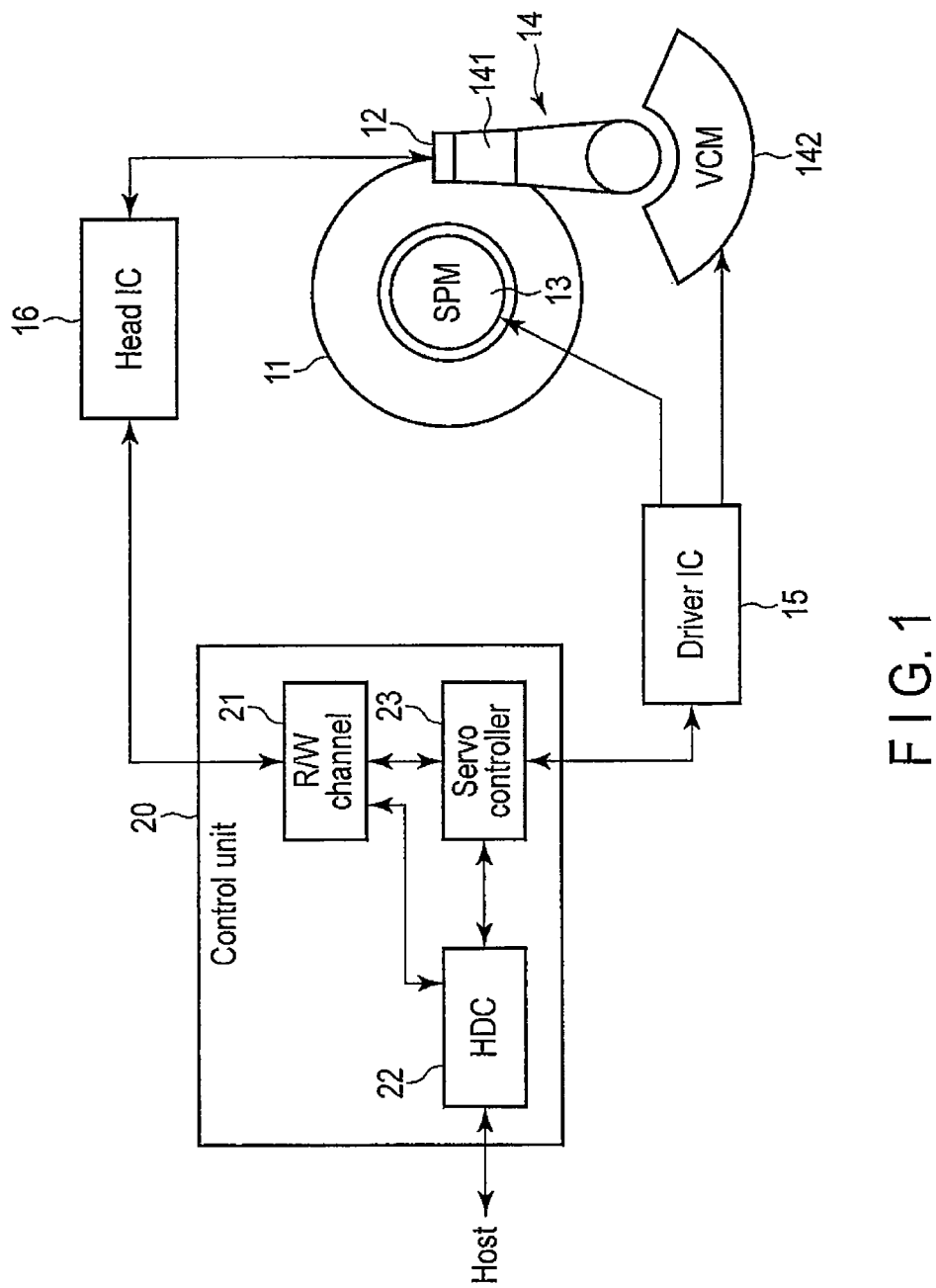
FIG. 1 is a block diagram showing an exemplary configuration of a magnetic disk drive according to an embodiment.

FIG. 1 is a block diagram showing an exemplary configuration of a magnetic disk drive according to an embodiment. The magnetic disk drive shown in FIG. 1 comprises a disk (magnetic disk) 11, a head (magnetic head) 12, a spindle motor (SPM) 13, an actuator 14, a driver IC 15, a head IC 16, and a control unit 20.

The disk 11 is a magnetic recording medium. The disk 11 comprises two disk surfaces, an upper surface and a lower surface. For example, the upper disk surface of the disk 11 forms a recording surface on which data is magnetically recorded. The recording surface (recording area) of the disk 11 comprises, for example, concentric tracks.

Figure 2:
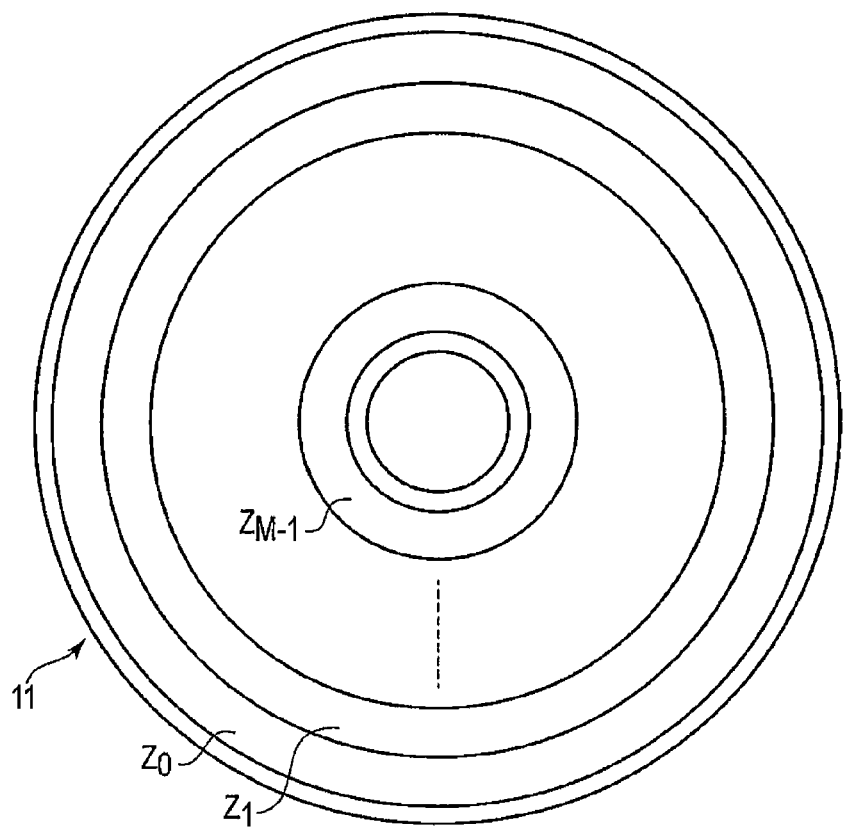
FIG. 2 is a diagram schematically showing an exemplary format of a disk applied in the embodiment.

FIG. 2 is a diagram schematically showing an exemplary format of the disk 11 applied in the embodiment. As shown in FIG. 2, the disk 11 (more specifically, the recording surface of the disk 11) is partitioned into M zones $Z_0, Z_1, \ldots,$ and $Z_{M-1}$ for management. That is, the disk 11 comprises the M zones $Z_0, Z_1, \ldots,$ and $Z_{M-1}$. The zones $Z_0, Z_1, \ldots,$ and $Z_{M-1}$ have zone numbers (identification numbers) of $0, 1, \ldots,$ and $Z_{M-1}$. Each of the zones $Z_0, Z_1, \ldots,$ and $Z_{M-1}$ comprises a plurality of tracks.

Figure 3:
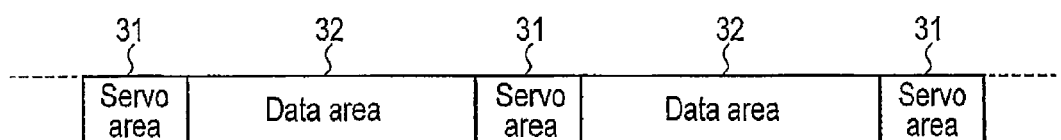
FIG. 3 is a diagram showing an exemplary format of a track on the disk applied in the embodiment.

FIG. 3 is a diagram showing an exemplary format of a track on the disk 11 applied in the embodiment. As shown in FIG. 3, the track is what is called a servo track comprising servo areas 31 discretely arranged at predetermined intervals. For convenience of drawing, the track is linearly (that is, schematically) expressed. The area between the adjacent servo areas (servo frames) 31 in the track is used as a data area (data frame) 32. The length of the servo area 31 and the length of the data area 32 (more specifically, the length of the servo area 31 and the length of the data area 32 in a circumferential direction of the disk 11) are referred to as the servo frame length and the data frame length.

FIG. 4 is a diagram showing an exemplary format of the servo area 31 applied in the embodiment, that is, an exemplary format of the servo frame. The servo frame comprises fields 41 to 44. The field 41 holds servo preamble data. That is, the field 41 has the servo preamble data recorded therein. The servo preamble data comprises a repeated pattern of a single frequency. The servo preamble data is used for generation of a servo clock signal using the PLL and for phase acquisition. The servo clock signal is used to read (reproduce) data written to the fields 42 to 44. The field 42 holds a servo mark (SM). The servo mark comprises a particular code (pattern signal) for use in identifying the corresponding servo frame (more specifically, the start position of the field 43 succeeding the field 42).

The field 43 holds address data. The address data comprises the cylinder address of the corresponding track and the address (that is, the servo sector address) of the corresponding servo frame (that is, the servo sector). The field 44 holds servo burst data. The servo burst data is data (what is called relative position data) for use in detecting displacement of (a positional error in) the head 12 from, for example, the center line of the corresponding track. The servo burst data comprises a repeated pattern of a predetermined period.

As seen again in FIG. 1, the head (head slider) 12 is arranged in association with the recording surface of the disk 11. The head 12 comprises a write element and a read element (neither of the elements is shown in the drawings). The head 12 (more specifically, the write element and the read element) is used to write data to the disk 11 and read data from the disk 11.

In the configuration in FIG. 1, the magnetic disk drive is assumed to comprise the single disk 11 However, the magnetic disk drive may comprise a plurality of stacked disks 11. Furthermore, in the configuration in FIG. 1, only the upper disk surface of the disk 11 forms a recording surface. However, the lower disk surface may also form a recording surface, and heads may be arranged in association with the respective opposite recording surfaces of the disk 11.

The disk 11 is rotated at a high speed by the SPM 13. The SPM 13 is driven by a driving current (driving voltage) supplied by the driver IC 15. The head (head slider) 12 is attached to the tip of an arm 141 of the actuator 14. The actuator 14 comprises a voice coil motor (VCM) 142 serving as a driving source for the actuator 14. The VCM 142 is driven by a driving current supplied by the driver IC 15. When the actuator 14 is driven by the VCM 142, the head 12 moves in a circular arc over the disk 11 in the radial direction of the disk 11.

The driver IC 15 drives the SPM 13 and the VCM 142 under the control of the control unit 20 (more specifically, a servo controller 23 in the control unit 20 which will be described below). The head IC 16 is also referred to as a head amplifier, and amplifies a signal read by the head 12 (that is, a read signal). The head IC 16 also converts write data output by the control unit 20 (more specifically, an R/W channel 21 in the control unit 20 which will be described below) into a write current. The head IC 16 then outputs the write current to the head 12.

The control unit 20 is implemented by, for example, a system LSI in which a plurality of elements including a microprocessor unit (MPU) and a memory are integrated together on a single chip. The control unit 20 comprises the read/write (R/W) channel 21, a disk controller (hereinafter referred to as HDC) 22, and a servo controller 23.

The R/W channel 21 processes signals related to reading and writing. That is, the R/W channel 21 converts the read signal amplified by the head IC 16 into digital data, and decodes the digital data into read data. The R/W channel 21 also extracts servo data from the digital data. The R/W channel 21 further encodes write data transferred by the HDC 22, and transfers the encoded write data to the head IC 16.

The HDC 22 is connected to a host (host device) via a host interface. The host utilizes the magnetic disk drive shown in FIG. 1 as the host's own storage device. The host and the magnetic disk drive shown in FIG. 1 are provided in an electronic device, such as a personal computer, a video camera, a music player, a mobile terminal, a mobile phone, or a printer device. The HDC 22 functions as a host interface controller that transmits signals the host and receives signals 1 from the host. Specifically, the HDC 22 receives commands (such as a write command and a read command) transferred by the host. The HDC 22 also controls the data transfer between the host and the HDC 22. The HDC 22 further functions as a disk interface controller that controls writing to the disk 11 and reading from the disk 11 via the head IC 16 and the head 12. The servo controller 23 controls the SPM 13 and the VCM 142. In particular, the servo controller 23 controls the VCM 142 in order to position the head 12 at a target position in a target track on the disk 11.

Now, an adjustment process including servo preamble length adjustment applied in the embodiment will be described with reference to FIG. 5. FIG. 5 is a flowchart showing an exemplary procedure for the adjustment process.

For example, in steps of manufacturing the magnetic disk drive (more specifically, test steps), the control unit 20 in the magnetic disk drive shown in FIG. 1 uses the procedure shown in FIG. 5 to execute the adjustment process as follows.

First, the control unit 20 executes well-known servo adjustment (block 501). The servo adjustment includes adjustment of parameters related to reading of servo data, for example, adjustment of the gain of a read amplifier provided in the head IC 16 (that is, the gain used when a signal read from the head 12 is amplified).

Then, the control unit 20 executes servo frame length adjustment (more specifically, servo preamble length adjustment) (block 502). In the servo preamble length adjustment (block 502), the length of the servo preamble data contained in the servo frame (that is, the servo preamble length) is adjusted to an optimum value for each of the zones on the disk 11. The servo preamble length adjustment (block 502) will be described below in detail. Here, the servo preamble length is not indicative of a physical length but of the number of repetitions of a repeated pattern of a single frequency. More specifically, the servo preamble length is indicative of the number of the periods of a reproduced waveform of the corresponding servo preamble data. The reason will be described below.

First, it is assumed that the number of repetitions is the same for an inner circumferential track TR1 on the disk 11 and for an outer circumferential track TR2 on the disk 11. In this case, in spite of the same number of repetitions for track TR1 and for track TR2, the physical length of the repeated pattern is larger in track TR2 than in track TR1. On the other hand, like the number of repetitions, period and duration of the reproduced waveform (that is, the reproduced waveform of a single frequency) of the servo preamble data are all the same for track TR1 and for track TR2. Thus, the embodiment expresses the preamble length as the number of repetitions or the duration. When the number of repetitions is denoted as r and the period of the reproduced waveform is denoted as T, the duration is represented as rT. The servo preamble length adjustment according to the embodiment means the adjustment of the duration rT (or the number of repetitions r).

The servo preamble length is conventionally set to a value with an appropriate margin assuming the worst case so as to reliably synchronize the phase of a servo clock signal with that of a reference clock signal (that is, so as to reliably acquire the phase of the servo clock frequency). That is, in the conventional art, the servo preamble length is set to a fixed value (more specifically, set equal to a fixed number of repetition periods) independently of the zones $Z_0$ to $Z_{M-1}$. The fixed servo preamble length (first servo preamble length) is assumed to be (n+m)T. Here, n and m are each an integer of larger than 1.

It is assumed that, unlike in the case of the embodiment, the lower disk surface of the disk 11 also forms a recording surface and that a head similar to the head 12 is arranged in association with the lower recording surface. In this case, in the conventional art, the servo preamble length is set to the fixed value of (n+m)T independently of the head and zone. In contrast, according to the embodiment, in the above-described block 502, the servo preamble length is adjustably set less than or equal to (n+m)T for each zone (or for each head and for each zone).

Upon adjusting the servo preamble length (block 502), the control unit 20 proceeds to block 503. In block 503, the control unit 20 newly formats (that is, reformats) the disk 11 based on the servo frame including servo preamble data with the servo preamble length (second servo preamble length) adjusted for each zone (that is, the servo frame with the servo frame length adjusted). Thus, the control unit 20 adjusts the data format for each zone. In the conventional art, the data format adjustment is executed based on servo frames each including a servo preamble data with a fixed servo preamble length of, for example, (n+m)T (that is, the servo frame with a fixed servo frame length).

The embodiment enables an increase in the linear recording density BPI (bits-per-inch) of each zone with the servo preamble length adjusted to a value smaller than (n+m)T. That is, the embodiment allows the data format efficiency of the disk 11 to be improved. Upon executing block 503, the control unit 20 adjusts the other parameters (block 504) and ends the adjustment process.

Figure 6:
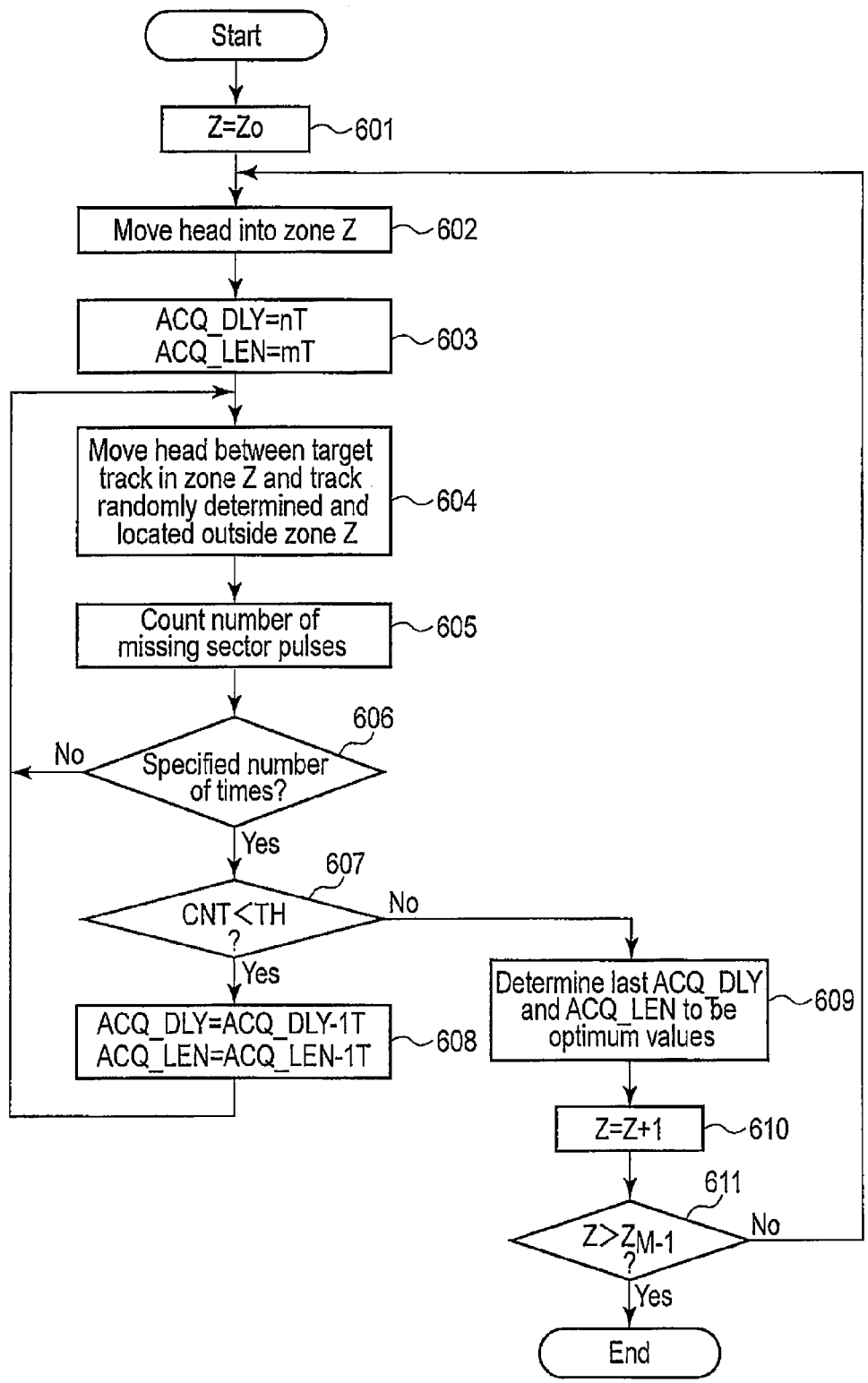
FIG. 6 is a flowchart showing an exemplary procedure for servo preamble length adjustment applied in the embodiment.

Now, the servo preamble length adjustment (block 502) will be described in detail with reference to FIG. 6. FIG. 6 is a flowchart showing an exemplary procedure for the servo preamble length adjustment. First, it is assumed that servo frames in the format shown in FIG. 3 are already recorded in each of the tracks on the disk 11. Here, the length of the servo preamble data contained in each of the servo frames (that is, the servo preamble length) is assumed to be set to a value with an appropriate margin, for example, (n+m)T (or a value greater than (n+m)T) independently of the zone $Z_0$ to $Z_{M-1}$.

In this state, the HDC 22 of the control unit 20 sets a target zone Z for servo preamble length adjustment to $Z_0$ (a zone with a zone number of 0) (block 601). Then, the servo controller 23 of the control unit 20 drives the VCM 142 via the driver IC 15 to move the head 12 into the zone Z (block 602). Here, it is assumed that the head 12 is moved to a track (target track) $TR_T$ in the zone Z.

The HDC 22 sets two parameters ACQ_DLY and ACQ_LEN required for the R/W channel 21 to acquire the phase of the servo clock frequency to initial values based on a read signal for the servo preamble data (block 603). That is, the HDC 22 sets the initial values of ACQ_DLY and ACQ_LEN in predetermined registers (that is, an ACQ_DLY register and an ACQ_LEN register) in the R/W channel 21.

The parameter ACQ_DLY (first parameter) specifies a delay time until the beginning of the phase acquisition (acquisition of phase of the servo clock frequency) executed by the PLL based on the read signal for the servo preamble data. The parameter ACQ_DLY is referred to as an acquisition delay parameter. In the embodiment, the parameter ACQ_DLY has an initial value of nT. The parameter ACQ_LEN specifies a duration for use in the phase acquisition. The parameter ACQ_LEN is referred to as an acquisition duration parameter. In the embodiment, the parameter ACQ_LEN has an initial value of mT.

Then, the servo controller 23 moves the head 12 between the track in the zone Z where the head 12 is currently positioned (that is, the target track $TR_T$) and a track $TR_R$ randomly determined and located outside the zone Z (block 604). That is, the servo controller 23 moves the head 12 temporarily to track $TR_R$ and then from track $TR_R$ to track $TR_T$. Namely, the servo controller 23 performs a random seek operation using the target track $TR_T$ as a base point.

Thus, the head 12 reads data including the servo data from the target track $TR_T$. The signal read by the head 12 (read signal) is amplified by the head IC 16. The amplified signal is transferred to the R/W channel 21. Upon detecting a servo preamble signal (that is, the reproduced waveform of the servo preamble data) in the read signal, the R/W channel 21 waits for the time specified by the parameter ACQ_DLY. Then, based on the servo preamble signal, the R/W channel 21 acquires the phase of the servo clock frequency. The R/W channel 21 thus outputs the servo clock signal.

Furthermore, based on the detection of the servo preamble signal, the R/W channel 21 asserts a servo gate for a time corresponding to the current servo frame length (that is, corresponding to the servo preamble length). When the servo gate is asserted, the R/W channel 21 detects a servo mark (SM) succeeding the servo preamble data in the read signal based on the servo clock signal. If the servo mark can be detected, the R/W channel 21 outputs a servo sector pulse. While the servo gate is being asserted, the R/W channel 21 demodulates address data and servo burst data succeeding the servo mark based on the servo clock signal. The servo controller 23 positions the head 12 at the target position in the target track $TR_T$ based on the demodulated address data and servo burst data.

During a predetermined period when the head 12 is being moved toward the target track $TR_T$, the HDC 22 counts the number of missing ones of the servo sector pulses output by the R/W channel 21 (block 605). Then, the HDC 22 determines whether the number of times that blocks 604 and 605 are executed has reached a specified value (block 606).

If the number of times that blocks 604 and 605 are executed has failed to reach the specified value (No in block 606), the HDC 22 passes control to the servo controller 23. Then, the servo controller 23 executes block 604 again. The HDC 22 executes block 605 again. In block 605, the number of missing servo sector pulses is added to the last count CNT.

Then, when the number of times that blocks 604 and 605 are executed reaches the specified value (Yes in block 606), the HDC 22 determines whether the count CNT of missing servo sector pulses is smaller than a threshold TH (block 607). The count CNT is indicative of the number of missing servo sector pulses counted in block 605 while blocks 604 and 605 are being executed a specified number of times.

If the count CNT is smaller than the threshold TH (Yes in block 607), the HDC 22 determines that the current ACQ_DLY and ACQ_LEN have values with sufficient margins and can thus be reduced (that is, the servo preamble length can be reduced). Thus, the HDC 22 reduces the values of the parameters ACQ_DLY and ACQ_LEN set in the ACQ_DLY register and ACQ_LEN register in the R/W channel 21, by ΔDLY and ΔLEN, respectively (block 608). In the embodiment, both ΔDLY and ΔLEN are assumed to be 1T for simplification of description. However, ΔDLY and ΔLEN may each have a value other than 1T, for example, 0.1T. That is, ΔDLY and ΔLEN can be set such that the minimum unit of parameter setting is equal to the stepping size determined by the resolution of the ACQ_DLY register and the ACQ_LEN register. Furthermore, ΔDLY and ΔLEN need not be the same value.

Upon executing block 608, the HDC passes control to the servo controller 23. Then, the servo controller 23 executes block 604 again. The HDC 22 executes block 605 again. Thus, with the set values of the parameters ACQ_DLY and ACQ_LEN in the R/W channel 21 reduced, blocks 604 and 605 are executed a specified number of times (block 606).

Then, the HDC 22 determines whether the count CNT of missing servo sector pulses is smaller than the threshold TH (block 607). If the count CNT is not smaller than the threshold TH (No in block 607), the HDC 22 determines the last set ACQ_DLY and ACQ_LEN to be the optimum values for the servo preamble length for all the servo frames in the zone Z (block 609). Here, the last set ACQ_DLY and ACQ_LEN are denoted as $ACQ\_DLY_Z$ and $ACQ\_LEN_Z$, respectively, so as to be distinguished from the current ACQ_DLY and ACQ_LEN. The HDC 22 stores $ACQ\_DLY_Z$ and $ACQ\_LEN_Z$ in the memory of the control unit 20 in association with the current zone Z. Here, $ACQ\_DLY_Z$ and $ACQ\_LEN_Z$ are greater than the current ACQ_DLY and ACQ_LEN, respectively, by 1T (that is, "ACQ_DLY+1T" and "ACQ_LEN+1T"). In the embodiment, "ACQ_DLY$_Z$+ACQ_LEN$_Z$" is used as the servo preamble length for all the servo frames in the zone Z.

Upon executing block 609, the HDC 22 increments Z (zone number) by one (block 610). The HDC 22 then determines whether the incremented Z is greater than $Z_{M-1}$ (block 611). If the incremented Z is not greater than $Z_{M-1}$ (No in block 611), the HDC 22 passes control to the servo controller 23. Then, the servo controller 23 drives the VCM 142 via the driver IC 15 to move the head 12 into the zone Z indicated by the incremented Z (block 602). Subsequently, the above-described operations are performed.

When Z incremented in block 610 is greater than $Z_{M-1}$ (Yes in block 611), the control unit 20 (more specifically, the HDC 22 in the control unit 20) confirms that the optimum values (ACQ_DLY$_Z$ and ACQ_LEN$_Z$) for ACQ_DLY and ACQ_LEN have been determined for all the zones $Z_0$ to $Z_{M-1}$. Then, the control unit 20 ends the servo preamble adjustment (block 502) in accordance with the flowchart in FIG. 6.

Upon executing the servo preamble adjustment (block 502), the control unit 20 proceeds to block 503 (see FIG. 5) as described above. In block 503, the control unit 20 reformats the disk 11 based on the servo preamble length (ACQ_DLY$_Z$+ACQ_LEN$_Z$) indicated by the optimum ACQ_DLY$_Z$ and ACQ_LEN$_Z$ for each zone Z determined by the servo preamble length adjustment. The control unit 20 thus adjusts the data format for each zone Z. The adjustment adjusts the length of the field 41 (servo preamble data) in each of all the servo areas (servo frames) 31 on all the tracks provided in the zone Z, to "ACQ_DLY$_Z$+ACQ_LEN$_Z$". Obviously, "ACQ_DLY$_Z$+ACQ_LEN$_Z$" is less than or equal to (n+m)T. Thus, the embodiment enables a reduction in the servo preamble length of the servo frame, improving the data format efficiency of the disk 11.

In the embodiment, for simplification of description, one track in the zone Z is used as a target track. However, two tracks (or more than two tracks) in the zone Z may be used as target tracks. In this case, blocks 604 and 605 may be executed half of a specified number of times using a first track in the zone (for example, an outer circumferential track in the zone Z) and may be executed half of a specified number of times using a second track in the zone (for example, an inner circumferential track in the zone Z).

In the embodiment, the control unit 20 counts the number of missing servo sector pulses by performing a random seek operation using the target track TR$_T$ as a base point. However, instead of performing the random seek operation, the control unit 20 may write data to the data area on the target track TR$_T$. In this case, the control unit 20 may count the number of missing servo sector pulses after writing. When the head IC 16 is switched from a write operation (that is, an operation of the write driver) to a read operation (that is, an operation of the read amplifier), the switching takes time. Thus, whether ACQ_DLY and ACQ_LEN (or the servo preamble length) have values with sufficient margins can be more effectively determined by counting the number of missing servo sector pulses during servo data reading following writing. This effect is significantly enhanced by executing the above-described writing after the random seek operation and counting the number of missing servo sector pulses after the writing.

Furthermore, in the embodiment, the servo sector pulse (more specifically, the number of missing servo sector pulses) is used as a parameter for determining whether ACQ_DLY and ACQ_LEN have values with appropriate margins. However, this determination parameter may be a parameter for any servo characteristic other than the servo sector pulse. Such a parameter may be a positioning error in positioning the head 12 on the target track TR$_T$ based on the servo data (more specifically, the address data and servo burst data succeeding the servo mark) or a time required for positioning (that is, settling time).

In the embodiment, only the upper disk surface of the disk 11 forms a recording surface, and the head 12 is arranged in association with the upper recording surface. Here, it is assumed that, unlike in the case of the above-described embodiment, the lower disk surface of the disk 11 also forms a recording surface comprising M zones $Z_0, Z_1, \ldots$, and $Z_{M-1}$, and that heads are arranged in association with the respective opposite recording surfaces. In this case, the optimum ACQ_DLY$_Z$ and ACQ_LEN$_Z$ may be determined for each head and for each zone.

At least one of the above-described embodiments can provide a magnetic disk drive that utilizes servo frames with the servo preamble length adjusted at least for each zone to enable a reduction in servo frame length, improving the format efficiency of the disk, as well as a method for servo preamble length adjustment applicable to the magnetic disk drive.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive, comprising:
a disk comprising a plurality of zones each including a plurality of tracks, the disk being formatted such that a plurality of servo frames are discretely recorded in each of the plurality of tracks, each of the servo frames comprising servo preamble data of a servo preamble length that corresponds to the zone that includes the track, the servo preamble length being less than or equal to a reference length that is common to the plurality of zones; and
a controller configured to cause a head to read the servo frames from the disk via a read amplifier, wherein the controller comprises:
a read/write channel configured to read a plurality of first servo frames from a track in each of the plurality of zones under a condition that is sequentially changed and set for phase acquisition based on a read signal for servo preamble data, the first servo frames each comprising servo preamble data of the reference length, and
a disk controller configured:
to determine a respective acquisition condition compatible with each of the plurality of zones based on a result of reading of the plurality of first servo frames from the track in the zone; and
to format the disk such that respective pluralities of second servo frames for tracks in the plurality of zones are recorded on the disk, the plurality of second servo frames for a given track comprising servo preamble data adjusted to the servo preamble length corresponding to the determined acquisition condition that is compatible with the zone that includes the given track.

2. The magnetic disk drive of claim 1, wherein:
the determined respective acquisition condition compatible with each of the plurality of zones includes a phase acquisition delay time and a phase acquisition duration; and
the disk controller is configured to set the phase acquisition delay time and the phase acquisition duration such that the time and the duration sequentially decrease from a time corresponding to the reference length.

3. The magnetic disk drive of claim 2, wherein the disk controller is further configured to determine the phase acquisition delay time and the phase acquisition duration based on a number of missing servo sector pulses included in the result of the reading of the plurality of first servo frames.

4. The magnetic disk drive of claim 2, wherein the disk controller is further configured to determine the phase acquisition delay time and the phase acquisition duration based on a positioning error or a time required for positioning which is included in the result of the reading of the plurality of first servo frames.

5. The magnetic disk drive of claim 1, wherein:
the disk comprises a first recording surface and a second recording surface each comprising the plurality of zones;
the head is arranged in association with the first recording surface as a first head, and a second head is arranged in association with the second recording surface;
the read/write channel is further configured to read the plurality of first servo frames for each of the first head and the second head and for each of the plurality of zones; and
the disk controller is further configured to format the disk such that the pluralities of second servo frames are recorded on the disk for each of the first head and the second head and for each of the plurality of zones.

6. A method for adjusting a servo preamble length in a magnetic disk drive comprising a disk which comprises a plurality of zones each having a plurality of tracks, the method comprising:
reading a plurality of first servo frames from a track in each of the plurality of zones under a condition that is sequentially changed and set for phase acquisition based on a read signal for servo preamble data, the first servo frames each comprising servo preamble data of a first length common to the plurality of zones;
determining a respective acquisition condition compatible with each of the plurality of zones based on a result of reading of the plurality of first servo frames from the track in the zone; and
formatting the disk such that respective pluralities of second servo frames for tracks in the plurality of zones are recorded on the disk, the plurality of second servo frames for a given track comprising servo preamble data adjusted to a second length corresponding to the determined acquisition condition that is compatible with the zone that includes the given track.

7. The method of claim 6, wherein:
the determined respective acquisition condition compatible with each of the plurality of zones includes a phase acquisition delay time and a phase acquisition duration; and
the method further comprises setting the phase acquisition delay time and the phase acquisition duration such that the time and the duration sequentially decrease from a time corresponding to the first length.

8. The method of claim 7, further comprising determining the phase acquisition delay time and the phase acquisition duration based on a number of missing servo sector pulses included in the result of the reading of the plurality of first servo frames.

9. The method of claim 7, further comprising determining the phase acquisition delay time and the phase acquisition duration based on a positioning error or a time required for positioning which is included in the result of the reading of the plurality of first servo frames.

10. The method of claim 6, wherein:
the disk comprises a first recording surface and a second recording surface each comprising the plurality of zones;
the head is arranged in association with the first recording surface as a first head, and a second head is arranged in association with the second recording surface;
the reading comprises reading the plurality of first servo frames for each of the first head and the second head and for each of the plurality of zones; and the formatting comprises formatting the disk such that the pluralities of second servo frames are recorded on the disk for each of the first head and the second head and for each of the plurality of zones.

* * * * *